United States Patent
Pelissier et al.

(10) Patent No.: US 6,661,773 B1
(45) Date of Patent: Dec. 9, 2003

(54) METHOD FOR DETECTION OF STALE CELLS FOLLOWING ROUTE CHANGES IN A DATA COMMUNICATION

(75) Inventors: Joseph E. Pelissier, Hillsboro, OR (US); Donald F. Cameron, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/326,573

(22) Filed: Jun. 7, 1999

(51) Int. Cl.$^7$ .............................. H04L 12/26; H04J 3/14; G06F 11/00; G08C 15/00
(52) U.S. Cl. .................... 370/228; 370/218; 370/236; 370/410; 709/237
(58) Field of Search .................... 370/228, 235, 370/236, 242, 244, 247, 395, 397, 389, 410, 216, 219, 221, 218; 709/232, 236, 237, 245

(56) References Cited

U.S. PATENT DOCUMENTS

| | | | | |
|---|---|---|---|---|
| 5,222,061 A | * | 6/1993 | Doshi et al. | 370/394 |
| 5,398,236 A | * | 3/1995 | Hemmady et al. | 370/218 |
| 5,436,886 A | * | 7/1995 | McGill | 370/219 |
| 5,568,476 A | * | 10/1996 | Sherer et al. | 370/236 |
| 5,754,754 A | * | 5/1998 | Dudley et al. | 714/18 |
| 5,999,515 A | * | 12/1999 | Ohashi | 370/235 |
| 6,226,298 B1 | * | 5/2001 | Holden et al. | 370/417 |
| 6,272,107 B1 | * | 8/2001 | Rochberger et al. | 370/216 |
| 6,337,852 B1 | * | 1/2002 | Desnoyers et al. | 370/236 |
| 6,396,835 B1 | * | 5/2002 | Nagata | 370/395 |
| 6,404,739 B1 | * | 6/2002 | Gonno | 370/236 |
| 6,480,897 B1 | * | 11/2002 | Desnoyers et al. | 709/237 |
| 6,496,481 B1 | * | 12/2002 | Wu et al. | 370/242 |

* cited by examiner

*Primary Examiner*—Steven H. D Nguyen
*Assistant Examiner*—M. Phan
(74) *Attorney, Agent, or Firm*—Blakely, Sokoloff, Taylor & Zafman LLP (57) ABSTRACT

A method for detecting and discarding stale cells following route changes in a data communication network. The data communication network comprises a transmitter, which upon detection of a failure in a route of a network, retransmits data tagged as resent data along a different route of a multi-stage switch; and a receiver, which upon detection of tagged data from the transmitter via the different route of the multi-stage switch, utilizes tagged data for data communications while discarding previously transmitted data that are not tagged to avoid data duplication.

18 Claims, 4 Drawing Sheets

METHOD FOR DETECTION OF STALE CELLS FOLLOWING ROUTE CHANGES IN A DATA COMMUNICATION

TECHNICAL FIELD

The present invention relates to a data communication network, and more particularly, relates to a method for detection of stale cells following route changes in a data communication network.

BACKGROUND

A data communication network is generally consisted of a network of nodes connected by point-to-point links. Each link may be a bi-directional communication path between two connect nodes (stations) within the network. Data may be transmitted in groups called cells or packets from a source to a destination, often through intermediate nodes. In many data communication networks, cells (or data packets) between two endpoints (e.g., end stations such as computers, servers and/or I/O devices) may transverse the network along a given path to ensure that cells are delivered in the order transmitted and without duplication. A control mechanism may be used to permit the re-transmission of a cell or group of cells if the original cell is corrupted in the network due to network errors, including, for example, random noise.

If a particular link between two connect nodes fails within the infrastructure of the network, retransmission cells may be re-routed by the control mechanism via an alternate link that does not include the failed link (assuming such a link exists). After the failure is detected, a new route chosen by the control mechanism, duplicate old cells may still exist in the network that have not yet transversed the old route. These cells may be referred to as stale cells. These stale cells may interact with cell retransmission which can result in delivery of duplicate cells. The duplicate cells must be eliminated in order to prevent corruption of data communication between two endpoints in the network.

Currently, there may be two techniques commonly employed to address the duplicate or stale cell problem. The first technique seeks to include a sequence number in each cell at the transmitting endpoint. This sequence number must be sufficiently large to ensure that a unique number may be assigned to every cell that may exist in the network infrastructure at any given time. Using the sequence number, the receiving endpoint may discard any cell that contains a sequence number that has been previously-received. The major disadvantage of this technique is that, in large data communication networks, the overall performance of the network can be significantly degraded, e.g., significant computing time can be spent in bookkeeping choirs. Moreover, in many data communication networks that support multiple and/or simultaneous communication flows between two endpoints, the large sequence number can significantly affect the cost of implementing the context store required for each flow.

The second technique seeks to ensure a quiet period just prior to, and for a time period after, the network is configured with the new route. This quiet period must be sufficiently long to ensure that all cells that were in the network infrastructure at the time of the re-route have exited the network. During this quiet period, endpoints affected by the re-route may be prohibited from injecting new cells into the network. There may be two significant limitations to this technique, however. First, the endpoints of the network must be coordinated to prevent injection of new cells into the network. This required participation of the endpoints may increase the complexity of the switching algorithm. Second, the required quiet time may be unacceptably long, particularly in large data communication networks which operate at significant network speeds.

Therefore, there is a need for a more flexible, cost-effective and performance-efficient technique for recovery from faults within a network infrastructure which requires neither a quiet period, nor that the transmitting endpoint be aware that the route through the network infrastructure has changed for data communications.

SUMMARY

Accordingly, various embodiments of the present invention are directed to a data communication network and a method for detection of stale cells following route changes in a data communication network. The data communication network comprises a transmitter, which upon detection of a failure in a route of a network, retransmits data tagged as resent data along a different route; and a receiver, which upon detection of tagged data, utilizes tagged data for data communications while discarding previously transmitted data that are not tagged to avoid data duplication.

BRIEF DESCRIPTION OF THE DRAWINGS

A more complete appreciation of exemplary embodiments of the present invention, and many of the attendant advantages of the present invention, will become readily apparent as the same becomes better understood by reference to the following detailed description when considered in conjunction with the accompanying drawings in which like reference symbols indicate the same or similar components, wherein.

DETAILED DESCRIPTION

The present invention is applicable for use with all types of data communication networks designed to link together end stations such as computers, servers, peripherals, storage devices, and communication devices for data communications. Examples of such data communication networks may include a local area network (LAN), a wide area network (WAN), a campus area network (CAN), a metropolitan area network (MAN), a global area network (GAN) and a system area network (SAN), including newly developed data networks using Next Generation I/O (NGIO) and Future I/O (FIO), now known as InfiniBand™ as set forth in the "InfiniBand™ Architecture Specification," the InfiniBand™ Trade Association on Oct. 24, 2000, and Server Net and those networks which may become available as computer technology develops in the future. LAN system may include Ethernet, FDDI (Fiber Distributed Data Interface) Token Ring LAN, Asynchronous Transfer Mode (ATM) LAN, Fiber Channel, and Wireless LAN. However, for the sake of simplicity, discussions will concentrate mainly on exemplary use of a simple data network having several example nodes interconnected by corresponding links, although the scope of the present invention is not limited thereto.

Figure 1A:
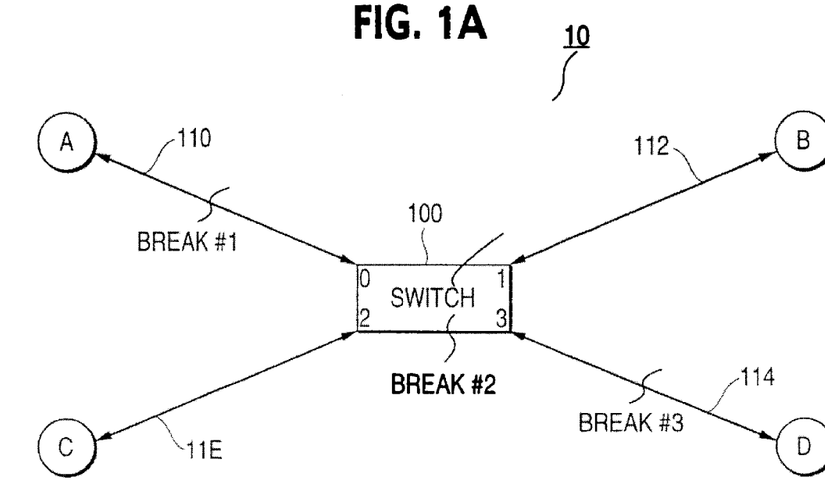
FIGS. 1A and 1B illustrate an example of a less advantageous data communication network having several nodes interconnected by corresponding links.
Figure 1B:
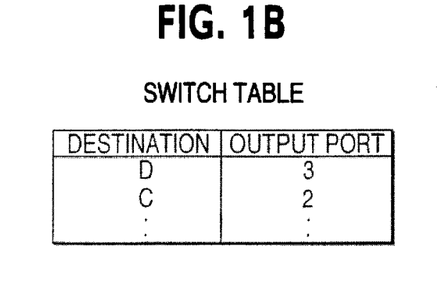

Attention now is directed to the drawings and particularly to FIGS. 1A and 1B, an example data communication network having several interconnected nodes for data communications is illustrated. As shown in FIG. 1A, the data communication network 10 may include, for example, a centralized switch 100 and four different nodes A, B, C, and D. Each node may correspond to an end station including, for example, a computer, a server and an input/output (I/O) device. The centralized switch 100 may contain switch ports 0, 1, 2, and 3 each connected to a corresponding node of the four different nodes A, B, C, and D via a corresponding physical link 110, 112, 114, and 116. The centralized switch 100 may also include a switch table (FIG. 1B) containing re-routing information in addition to routing information using, for example, explicit routing and/or destination address routing.

As shown in FIG. 1B, the switch table may contain listing of destination node addresses and corresponding destination ports, for example, node D and a corresponding switch port 3 (i.e., received cells destined for node D are output from switch port 3) and node C and a corresponding switch port 2. Since there is no redundancy or redundant link available for data communications, a problem such as a temporary or permanent interruption may occur if a break occurs anywhere within the data communication network of FIGS. 1A and 1B. Such a break may occur, for example, along a node port of node A or along a corresponding link 110 as illustrated by break #1. Similarly, a break may occur at the centralized switch 100 as illustrated by break #2. Likewise, a break may occur along a node port of node D or along a corresponding link 114 as illustrated by break #3. As shown in FIGS. 1A and 1B, when any of these example breaks #1, #2 and/or #3 occurs anywhere within the data communication network there is no way of transmitting data in groups of cells to an affected node.

Figure 2:
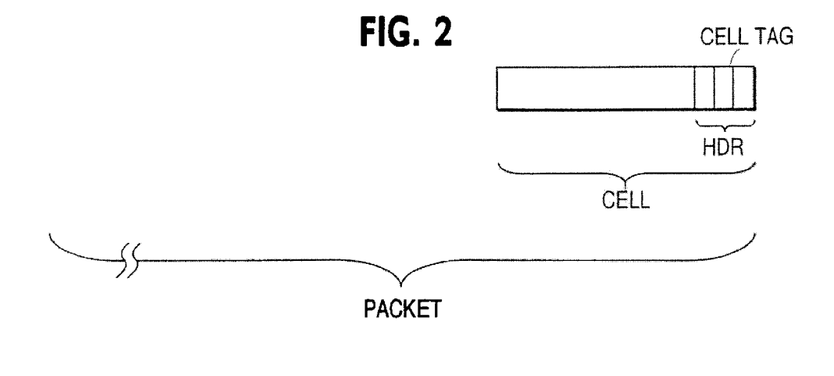
FIG. 2 illustrates an example data in groups of cells for communications according to the principles of the present invention.

Turning now to FIGS. 2–6, example redundant types of data communication networks having redundant links or alternate routes according to an embodiment of the present invention are illustrated. These redundant types of data communication networks may be used to ensure that data in groups of cells (or data packets as per InfiniBand™ Architecture Specification) are successfully transmitted to respective destination nodes without cell duplication or stale cells in the event of a break of some links or components in the network. Before beginning to discuss the operation of the redundant type of data communication network, discussion first turns to FIG. 2 which describes the difference between a packet and a cell of data transmitted from a source node to a destination node through switches and/or other intermediate nodes. As shown in FIG. 2, a packet may represent a large data entity of user data and may be implemented as four (4) gigabytes minus one (1) in addition to cell header information and cyclic redundancy check (CRC) information. In contrast, a cell may be a subset of a packet or via verse. In particular, each cell may correspond to 256 bytes, for example, and contain a header (HDR) including a cell tag which will be described in the following discussion.

Figure 3:
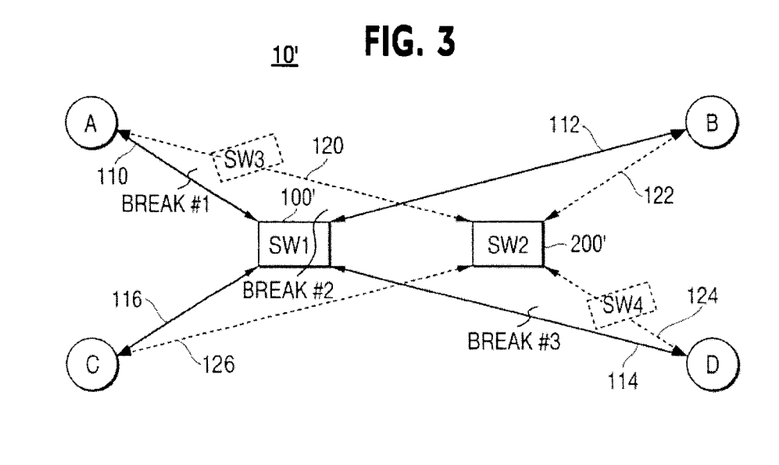
FIG. 3 illustrates an example redundant data communication network having alternate switches for data communications between several interconnected nodes via corresponding links and alternate links according to an embodiment of the present invention.

Discussion now turns to FIG. 3, which illustrates an example redundant type network having redundancy paths or alternate links (routes) used in the event of a break of some links or components in the network. As shown in FIG. 3, the example redundant type network 10' may also include a second switch 200' (SW2) in addition to the first switch 100' (SW1) and the four different nodes A, B, C, and D shown in FIG. 1. The second switch 200' (SW2) may be used to provide a set of redundant paths from source nodes to destination nodes, via one or more intermediate nodes, in order to ensure that data are delivered to respective destination nodes in the event of a break of some links or components in the network. Accordingly, if a break occurs along any one of the link 110 between node A and switch 100' (SW 1) as indicated by break #1, or switch SI as indicated by break #2, or the link 114 between switch SW1 and node D as indicated by break #3, the data transmitted from a source node to a destination node can be re-routed along the redundant path using the second switch 200' (SW2).

The problem sought to be solved by the present invention may not necessarily be a permanent breakage within the redundant network, but instead, a temporary blockage or breakage within such network. More particularly, for example, assuming that data are to be transmitted from source node A to destination node D, source node A may contain a predetermined hierarchy or list therein for use to send data along a preferred path (link). For example, node A may contain a predetermined listing indicating that data should first be transmitted through switch SW1 to node D and then, if problems occur, the alternate link or path through switch 200' (SW2) should then be attempted. Accordingly, when node A of the redundant type network as shown in FIG. 3 first begins to transmit data to node D through switch SW1, and assuming that a blockage or temporary breakage occurs at any one of the locations break #1, break #2 and/or break #3, the redundant type network of FIG. 3 may contain some types of arrangement for detecting a problem within the redundant network.

For example, when node A sends data to node D, node A expects an acknowledgment of receipt of such data from node D within a predetermined time period. If such an acknowledgment does not occur within a predetermined time period, node A assumes that cells (or data packets) which were not acknowledged were never received by node D, and further assumes that there is a problem occurring along the previous route selected to transmit the data. Accordingly, node A switches to an alternate predetermined route for re-routing the cells around the failed link(s) in order to ensure that data are successfully delivered to respective destination nodes in the network. In the present situation, node A attempts to retransmit the non-acknowledged cells through the switch 200' (SW2) to node D. However, a problem occurs if node A has re-transmitted a series of cells and then the temporary blockage or breakage becomes free and then node D begins to receive redundant or duplicate cells along or from both of the switches 100' and 200' (SW1 and SW2). These redundant or duplicate cells are known as stale cells and need to be discarded from the network for reliable and efficient cell relay operations.

Figure 4:
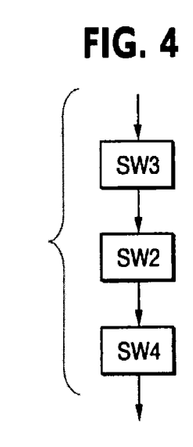
FIG. 4 illustrates example cascaded switches of the redundant data communication network as shown in FIG. 3.

The present invention seeks to simply and efficiently detect and discard these redundant or duplicate stale cells from the network for reliable cell relay operations by using a "cell tagging" technique for each communication flow between a source node and destination node individually. More particularly, the header HDR of the cell (or individual data packet) which contains data pertaining to cell tagging as shown in FIG. 2 may be used by each switch or node within the redundant type network to determine which cells are tagged and not tagged for discarding purposes. Accordingly, upon occurrence of detection of a route problem, a source node or node A as shown in FIGS. 3 and 4 may automatically enter a cell tagging mode as part of an internal re-route algorithm, and remain in such a cell tagging mode for cell tagging during a predetermined cell tagging interval. A destination node or node D may then receive tagged cells and, upon receipt of a first tagged cell, automatically enter a reject untagged cell mode as part of an internal re-route algorithm, and remain in such a reject untagged cell mode for one half (½) the cell tagging interval (for example) so as to discard all received cells that are not tagged (stale cells). The period of the cell tagging interval may be set relative to the maximum delay time for a cell to exist in all routes within a switch fabric of the redundant type network before being either delivered to a destination node or discarded from the network. This is a period known as a fabric lifetime within a switch fabric of the redundant type network that is determined by each switch within the switch fabric to insure that all stale cells are exited from the switch fabric. For purposes of this disclosure, the period of the cell tagging interval may be set as twice the fabric lifetime (for example) to ensure that there may be no overlap between the cell tagging mode of the source node and the reject untagged cell mode of the destination node. However, it should be noted that the present invention is not limited to such intervals. The cell tagging interval may be set as any discrete value greater than the fabric lifetime, as long as the destination node D, as shown in FIG. 3, for example, may be assured to be removed from the reject untagged cell mode before the source node A, as shown in FIG. 3, for example, stops tagging incoming cells in the next cell tagging mode to avoid mode overlapping. A link failure or route problem within the network may be determined, for example, by a control mechanism of a source node A utilizing a time-out of a response or by a central network manager managing general faults or link failures of the network.

More particularly, FIG. 3 is a very simplistic illustration of a redundant type network for the sake of clarity and brevity. Instead of just two switches 100' and 200' (SW1 and SW2), in fact, the network may include many switches. For example, as indicated by the dashes within the redundant type network, the path from source node A to destination node D through the switch S2 may actually include additional switches SW3 and SW4.

Turning now to FIG. 4, and assuming that each of the switches SW3, SW2 and SW4 which are cascaded as shown incurs a delay of, for example, 10 microseconds, a total maximum delay through the switching fabric would be 30 microseconds to transmit data from source node A to destination node D. The present invention then sets the cell tagging interval to approximately twice the maximum delay (fabric lifetime) or two times 30 microseconds equals to 60 microseconds of a cell tagging interval which is effected at node A. In contrast, the receiving node or node D only enters the cell tagging interval (upon receiving any first tagged cell) for only during the fabric lifetime, that is, one-half (½) of the maximum cell tagging interval or 60 microseconds divided by two equals the 30 microseconds.

When node A is in a cell tagging mode, node A may insert information data (e.g., a special code) pertaining to cell tagging into the header HDR of each cell which was not acknowledged from a destination node or node D, and then re-route each tagged cell to the destination node or node D through a redundant or alternate route (link) which is different from the previously detected problematic route based on its predetermined listing. In the example as described with reference to FIGS. 3 and 4, node A may retransmit all cells which were not acknowledged by destination node D by way of transmitting the tagged cells to node D through second switch 200' (SW2). Upon expiration of the cell tagging interval, the cell tagging mode of a source node or node A may be terminated automatically based on a built-in internal timer (not shown).

When a first tagged cell transmitted from node A arrives at node D, node D may read the cell tagging information from the header of the tagged cell and immediately enter a reject untagged cell mode for one half (½) the cell tagging interval, that is, for 30 microseconds. Thereafter, destination node or node D may assume for one half (½) cell tagging interval that only the received cells having the activated cell tagging are valid cells, and then promptly discard any redundant cells which may have received from the source node or node A through first switch 100' (SW1). In other words, the destination node or node D may ignore all untagged cells which may have received from the source node or node A at input ports.

Upon expiration of one-half (½) cell tagging interval, the reject untagged cell mode of a destination node or node D may be terminated automatically based on a built-in internal timer (not shown). Each destination node such as node D described with reference to FIGS. 3 and 4 may further include a mechanism which provides a source node or node A an indication that previously clogged or redundant cells are now being received again, and that the temporarily blocked/broken network link is now fixed. That way the source node or node A may stop cell tagging and return to using the previously broken, but now fixed network link for data communications. As a result, the redundant cells can be simply and effectively discarded from the network and the use of redundant cells can be completely avoided, thus guaranteeing an integrity of the network.

Figure 5:
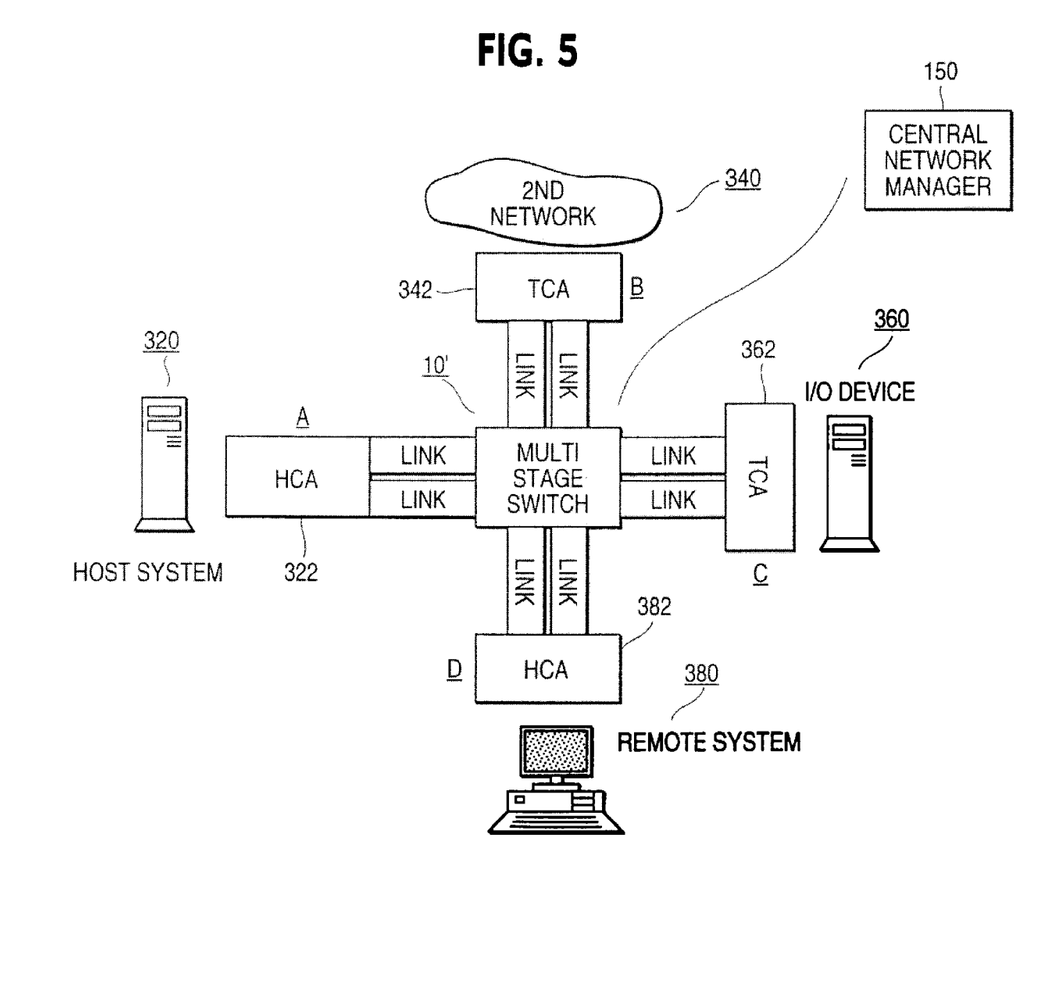
FIG. 5 illustrates an example implementation of a redundant data communication network using an example input/output (I/O) channel architecture according to an embodiment of the present invention.

FIG. 5 illustrates an example implementation of a redundant data communication network having an example input/output (I/O) channel architecture for data communications according an embodiment of the present invention. As shown in FIG. 5, the redundant data communication network includes a multi-stage switch 10' comprised of a plurality of switches, including, for example, first and second switches 100' and 200' (SW1 and SW2) of FIG. 3 for allowing host systems and target systems to communicate to a large number of other host systems and target systems. In addition, any number of end stations, switches and links may be used for relaying data in groups of cells between the end stations and switches via corresponding links. For example, node A may represent a host system 320 as shown in FIG. 5. Similarly, node B may represent another network, including, but not limited to, local area network (LAN), Ethernet, ATM and fibre channel network. Node C may represent an input/output (I/O) device 360. Likewise, node D may represent a remote system 380 such as a computer or a server. Alternatively, nodes A, B, C, and D of FIG. 3 may also represent individual switches of the multi-stage switch 10' which serve as intermediate nodes between the host system 320 and the target systems 340, 360 and 380.

The multi-state switch 10' may include a central network manager 150 connected to all the switches for managing all network management functions. However, the central network manager 150 may alternatively be incorporated as part of either the host system 322, the second network 340, the I/O device 360, or the remote system 380 for managing all network management functions. In either situation, the central network manager 150 may be configured for learning network topology, determining the switch table or forwarding database, detecting and managing faults or link failures in the network and performing other network management functions. When there may be faults or link failures in the network, the central network manager 150 may alert the source node or node A to automatically enter a cell tagging mode for cell tagging purposes, that is, for re-routing or re-transmitting the same cells to a destination node or node D around the failed links where alternate links exist in the network while discarding redundant or stale cells from the switch.

Separately, the central network manager 150 may also be used to determine the maximum delay time (fabric lifetime) that a cell may exist in the switch fabric before being either delivered to a destination node or discarded from the switch fabric. As described with reference to FIGS. 3 and 4, the fabric lifetime may be utilized to insure that all stale cells are exited from the switch fabric. The fabric lifetime may be determined by first calculating a switch cell lifetime, that is, the time a cell may exist in a given switch, then calculating the maximum time a cell may exist in all routes within the switch fabric.

A host channel adapter (HCA) 322 may be used to provide an interface between a memory controller (not shown) of the host system 320 and a multi-stage switch 10' via high speed serial links. Similarly, target channel adapters (TCA) 342, 362 may be used to provide an interface between the multi-stage switch 10' to an I/O controller of either an I/O device 360 or a remote system 380 via high speed serial links. Separately, another host channel adapter (HCA) 382 may also used to provide an interface between a memory controller (not shown) of the remote system 380 and the multi-stage switch 10' via high speed serial links.

Figure 6:
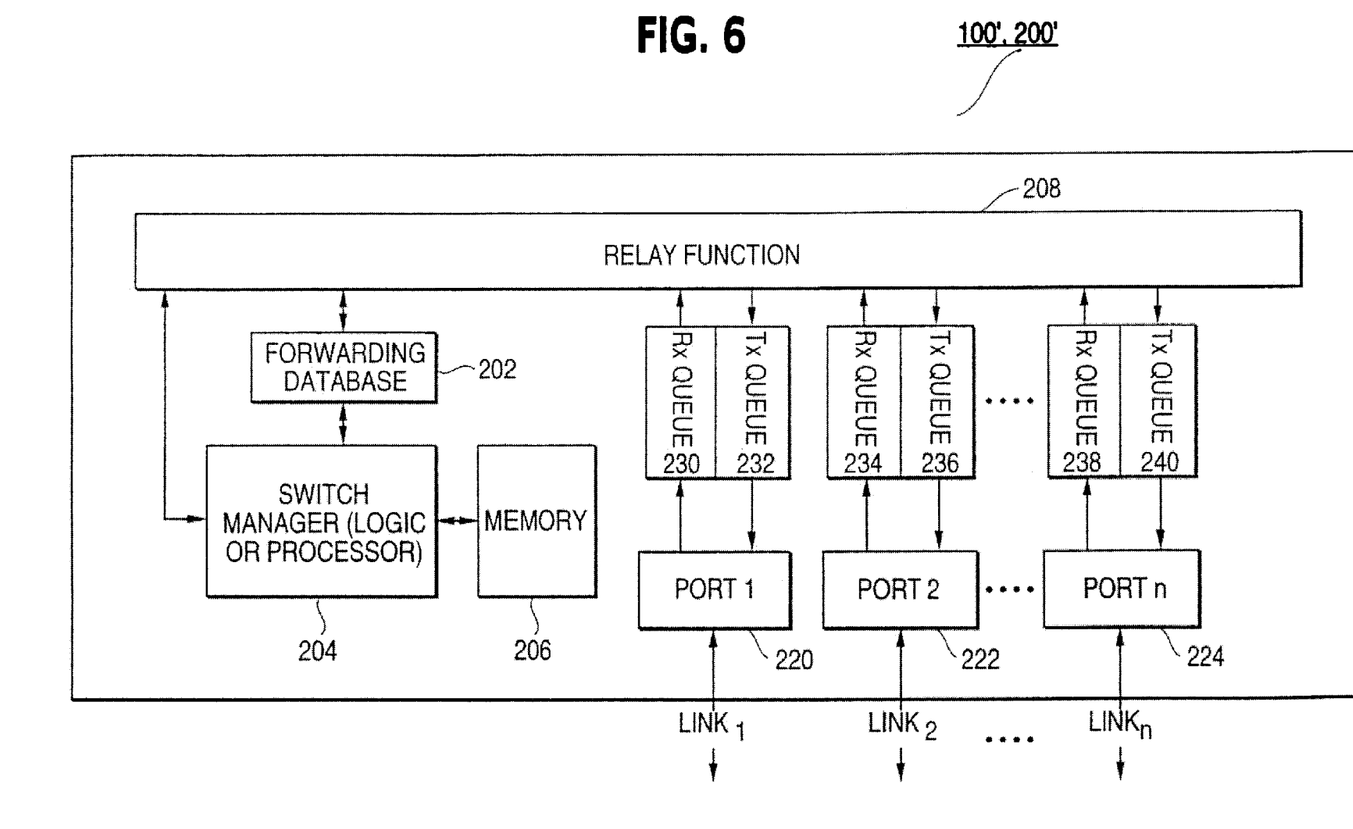
FIG. 6 is a block diagram of an example individual switch of a multistage switch of an example redundant data communication network according to an embodiment of the present invention.

FIG. 6 is a block diagram of an example individual switch of a multi-stage switch 10' of an example redundant data communication network according to an embodiment of the present invention. Each switch 100' or 200' of the multi-stage switch 10' may include a switch table or forwarding database 202, a switch manager 204, a memory 206, a relay function unit 208, a plurality of switch ports, including ports 1-n (shown as ports 220, 222 and 224), and a plurality of receive (Rx) and transmit (Tx) queues 230–240. A switch manager 204 may be a logic or processor used for managing all functions of a switch. For example, the switch manager 204 may relay cells between the host system 320 and the target systems 340, 360, 380 and, if serving as an intermediate node within the network, may re-route or re-transmit the same cells to target systems 340, 360, 380 around the failed links in the event of a break in the links or components of the network while discarding redundant or stale cells from the switch fabric. A memory 206 may optionally contain a re-route or cell tagging information for re-routing cells around the failed links where alternate links exist in the network when serving as an intermediate node between a source node and a destination node. A relay function unit 208 may be provided for relaying received cells to specific destination ports. The receive (Rx) and transmit (Tx) queues 230–240 may be connected between the relay function unit 268 and each switch port 220, 222 and 224.

The switch manager 204 may communicate with the central network manager 150 as shown in FIG. 5 to receive information for switch initialization (e.g., to receive the switch address) and to receive and download the forwarding database 202. The switch manager 204 may also manage the forwarding or relaying of cells between links using either destination address routing, explicit routing or a combination of the two. In addition, when serving as an intermediate node between a source node and a destination node, the switch manager 204 may also control the re-route or cell tagging operation in the event of a break of some links or components in the network in order to insure that all stale cells are discarded from the switch fabric in the manner described with reference to FIGS. 3–4.

For example, if a source node and a destination node of the example redundant data communication network represent a host system 320 and a remote system 380 respectively as shown in FIG. 5, then the host system 320 may be set to automatically enter a cell tagging mode in response to detection of a link failure or route problem within the network, and the remote system 380 may be set to automatically enter a reject untagged cell mode in response to receipt of a first tagged cell from the host system 320. A link failure or route problem within the network may be determined, for example, by either a time-out mechanism of the host system 320 or by the central network manager 150 of the multi-stage switch 10'. If the central network manager 150 is configured to inform the source node or host system 320 of the link failure or route problem of the network, then the time-out mechanism may not be needed for the source node or host system 320 to detect such a link failure. Other link failure detection mechanisms may also be used instead of the time-out mechanism of the host system 320 or the central network manager 150 of the multi-stage switch 10' as long as link failures of the network are detected for cell tagging purposes.

The host system 320 may contain a built-in timer (not shown) set for cell tagging during a cell tagging interval. Upon expiration of the cell tagging interval, the host system 320 may be automatically reverted from the cell tagging mode back to normal operation. Likewise, the remote system 380 may contain a built-in timer (not shown) set for rejecting untagged cells (i.e., stale cells) during a reject untagged cell mode having a period one half (½) the cell tagging interval. Again, the cell tagging interval may be set as twice the fabric lifetime to ensure that there may be no overlap between the cell tagging mode of the source node and the reject untagged cell mode of the destination node. However, any discrete value greater than the fabric lifetime may be suitable as long as the destination node may be assured to be removed from the reject untagged cell mode before the source node stops tagging incoming cells in the next cell tagging mode to avoid mode overlapping for each communication flow between the source node and the destination node of the network infrastructure.

The remote system 380 may also contain a mechanism which informs the host system 320 that the temporary link failure in the network is now fixed. That way the host system 380 may stop cell tagging and return to using the previously broken, but now fixed network link for data communications. As a result, the redundant cells can be simply and effectively discarded from the network and the use of redundant cells can be completely avoided, thus guaranteeing an integrity of the network.

As described from the foregoing, the present invention advantageously provides a unique cost-effective and performance-efficient solution for recovery from faults or link failures within a network infrastructure which requires neither a quiet period, nor that the transmitting endpoint be aware that the route through the network infrastructure has changed for data communications. Switch elements of a multi-stage switch permit routing and alternate routing of data in groups of cells between endpoints efficiently on an individual communication flow basis.

While there have been illustrated and described what are considered to be exemplary embodiments of the present invention, it will be understood by those skilled in the art and as technology develops that various changes and modifications may be made, and equivalents may be substituted for elements thereof without departing from the true scope of the present invention. For example, the present invention is applicable to all types of redundant type networks, including, but not limited to, Next Generation Input/Output (NGIO), InfiniBand™ ATM, SAN (system area network, or storage area network), server net, Future Input/Output (FIO), fiber channel, Ethernet). Many modifications may be made to adapt the teachings of the present invention to a particular situation without departing from the scope thereof. Therefore, it is intended that the present invention not be limited to the various exemplary embodiments disclosed, but that the present invention includes all embodiments falling within the scope of the appended claims.

What is claimed is:

1. A network, comprising:
   a transmitter to transmit data along a route of a network and, upon detection of a failure in a route of the network, retransmit data tagged as resent data along a different route of the network;
   a receiver to receive data transmitted from the transmitter and, upon detection of tagged data, utilize said tagged data for data communications, while discarding data that are not tagged to avoid data duplication; and
   a switch fabric which comprises a plurality of different routes for connecting said transmitter and said receiver for data communications;
   wherein said data is transmitted in groups of cells with each cell having a header utilized for tagging by said transmitter upon detection of a failure in a route of the network; and
   wherein said transmitter automatically switches to a cell tagging mode to tag unique information on said data in groups of cells individually and retransmit said tagged data as resent data along a different route of the switch fabric to said receiver during a cell tagging interval.

2. A network as claimed in claim 1, wherein said cell tagging interval is set to twice a maximum delay time that a cell exists in the switch fabric before being delivered to said receiver or discarded from the switch fabric.

3. A network as claimed in claim 2, wherein said transmitter comprises a timer which terminates said cell tagging mode upon expiration of said cell tagging interval.

4. A network, comprising:
   a transmitter to transmit data along a route of a network and, upon detection of a failure in a route of the network, retransmit data tagged as resent data along a different route of the network;
   a receiver to receive data transmitted from the transmitter and, upon detection of tagged data, utilize said tagged data for data communications, while discarding data that are not tagged to avoid data duplication; and
   a switch fabric which comprises a plurality of different routes for connecting said transmitter and said receiver for data communications;
   wherein said data is transmitted in groups of cells with each cell having a header utilized for tagging by said transmitter upon detection of a failure in a route of the network; and
   wherein said receiver automatically switches to a reject untagged cell mode, upon receipt of a first tagged cell of said resent data retransmitted from said transmitter, to discard all previously transmitted data that are not tagged by said transmitter to avoid data duplication for a duration that is one-half (½) of said cell tagging interval.

5. A network as claimed in claim 4, wherein said receiver comprises a timer which terminates said reject untagged cell mode upon expiration of the duration that is one-half (½) of said cell tagging interval.

6. A network arrangement, comprising:
   a host system;
   at least one remote system;
   a switch fabric comprising a plurality of different switches which interconnect said host system to said remote system along different routes for data communications, and a central network manager connected to the different switches for managing network management functions, including detecting and managing link failures along different routes between said host system and said remote system;
   wherein said host system, upon detection of a link failure in a route to said remote system via said switch fabric, tags data previously transmitted to said remote system and transmits tagged data as resent data along an alternate route to said remote system;
   wherein said remote system, upon detection of tagged data transmitted from said host system via said switch fabric, utilizes said tagged data for data communications, while discarding previously transmitted data that are not tagged to avoid data duplication;
   wherein said data is transmitted from said host system to said remote system in groups of cells with each cell having a header utilized for tagging by said host system upon detection of a link failure in the route to said remote system via said switch fabric; and
   wherein said host system automatically switches to a cell tagging mode to tag unique information onto said data in groups of cells individually and transmit said tagged data as resent data along an alternate route to said remote system during a cell tagging interval.

7. A network arrangement, comprising:
   a host system;
   at least one remote system;
   a switch fabric comprising a plurality of different switches which interconnect said host system to said remote system along different routes for data communications, and a central network manager connected to the different switches for managing network management functions, including detecting and managing link failures along different routes between said host system and said remote system;
   wherein said host system, upon detection of a link failure in a route to said remote system via said switch fabric, tags data previously transmitted to said remote system and transmits tagged data as resent data along an alternate route to said remote system;
   wherein said remote system, upon detection of tagged data transmitted from said host system via said switch fabric, utilizes said tagged data for data communications, while discarding previously transmitted data that are not tagged to avoid data duplication;
   wherein said data is transmitted from said host system to said remote system in groups of cells with each cell having a header utilized for tagging by said host system upon detection of a link failure in the route to said remote system via said switch fabric; and wherein said cell tagging interval is set to twice a maximum delay time that a cell exists in said switch fabric before being delivered to said remote system or discarded from said switch fabric.

8. A network arrangement as claimed in claim 7, wherein said host system comprises a timer which terminates said cell tagging mode upon expiration of said cell tagging interval.

9. A network arrangement, comprising:

a host system;

at least one remote system;

a switch fabric comprising a plurality of different switches which interconnect said host system to said remote system along different routes for data communications, and a central network manager connected to the different switches for managing network management functions, including detecting and managing link failures along different routes between said host system and said remote system;

wherein said host system, upon detection of a link failure in a route to said remote system via said switch fabric, tags data previously transmitted to said remote system and transmits tagged data as resent data along an alternate route to said remote system;

wherein said remote system, upon detection of tagged data transmitted from said host system via said switch fabric, utilizes said tagged data for data communications, while discarding previously transmitted data that are not tagged to avoid data duplication;

wherein said data is transmitted from said host system to said remote system in groups of cells with each cell having a header utilized for tagging by said host system upon detection of a link failure in the route to said remote system via said switch fabric; and wherein said remote system automatically switches to a reject untagged cell mode, upon receipt of a first tagged cell of said resent data transmitted from said host system via said switch fabric, to discard all previously transmitted data that are not tagged by said host system to avoid data duplication for a duration that is one-half (½) of said cell tagging interval.

10. A network arrangement as claimed in claim 9, wherein said remote system comprises a timer which terminates said reject untagged cell mode upon expiration of the duration that is one-half (½) of said cell tagging interval.

11. A network arrangement as claimed in claim 6, wherein each switch of said switch fabric comprises:

a plurality of ports, each port connected to a link;

a receive queue and a transmit queue coupled to each port;

a forwarding database for storing cell routing information;

a relay entity coupled to the queues and the forwarding database, for obtaining cell routing information from the forwarding database and relaying the cell to the port specified by the cell routing information; and a management entity coupled to the relay entity, for routing the cell to said remote system.

12. A method for detecting and discarding stale cells following route changes in a data communication network comprising at least a source node, a destination node, and a multi-stage switch comprised of a plurality of different routes connecting said source node to said destination node, said method comprising:

transmitting, at said source node, data in groups of cells to said destination node alone a route of said multi-stage switch;

detecting a link failure along the route of said multi-stage switch between said source node and said destination node;

upon detection, at said source node, of said link failure along the route of said multi-stage switch between said source node and said destination node, tagging unique tagging code onto a header of each cell of previously transmitted data for a cell tagging interval, and transmitting tagged cells as resent data to said destination node along an alternate route of said multi-stage switch; and upon detection, at said destination node, of a first of tagged cells transmitted as resent data from said source node via said multi-stage switch, discarding all untagged cells for a reject untagged cell interval and utilizing said tagged cells for data communications;

wherein said cell tagging interval, corresponds to twice a maximum delay time that a cell exists in said multi-stage switch before being either delivered to said destination node or discarded from said multi-stage switch, and said reject untagged cell interval corresponds to one-half (½) of said cell tagging interval.

13. A network comprising:

a source node to transmit data;

a destination node to receive and acknowledge data transmitted from the source node; and a switch fabric including a plurality of switches to establish connection links between the source node and the destination along different routes for data communications;

wherein the source node is configured to detect a link failure along a route to the destination node, to tag data that was not acknowledged from the destination node during a data tagging mode, and to transmit tagged data along an alternate route to the destination node;

wherein the destination node is configured to discard, upon receipt of the tagged data transmitted from the source node, data that are not tagged during a untagged data reject mode; and wherein the source node remains in the data tagging mode to tag data that was not acknowledged from the destination node for a tagging period greater than twice a lifetime of the switch fabric indicating a maximum delay time that data packets exist in the switch fabric before being delivered to the destination node or discarded from the switch fabric.

14. A network as claimed in claim 13, wherein the destination node remains in the untagged data reject mode for one-half (½) of the tagging period used by the source node to tag data for transmission along the alternate route.

15. A network as claimed in claim 13, wherein the data is tagged by prepending a special code to a header of each individual data packet during the data tagging mode prior to transmission to the destination node along the alternate route.

16. A method for detecting and discarding stale data packets following route changes in a data communication network comprising at least a source node, a destination node, and a switch fabric comprised of a plurality of switches to establish connection links between the source node and the destination along different routes for data communications, said method comprising:

transmitting, at the source node, data in groups of packets along a route to the destination node;

detecting a link failure along the route between the source node and the destination node;

upon detection, at the source node, of the link failure along the route between the source node and the destination, tagging a unique code onto each data packet of previously transmitted data for a data tagging period, and transmitting tagged data packets to the destination node along an alternate route; and upon detection, at the destination node, of a first of tagged data packets transmitted from the source node, discarding all untagged data packets for an untagged data reject period and utilizing said tagged data packets for data communications;

wherein the data tagging period is greater than twice a lifetime of the switch fabric indicating a maximum delay time that data packets exist in the switch fabric before being delivered to the destination node or discarded from the switch fabric.

17. A method as claimed in claim 16, wherein the untagged data reject period is one-half (½) the data tagging period used by the source node to tag data packets for transmission along the alternate route.

18. A method as claimed in claim 16, wherein the source node contains a timer configured to terminate the tagging of individual data packets, upon expiration of the data tagging period.

* * * * *

UNITED STATES PATENT AND TRADEMARK OFFICE
CERTIFICATE OF CORRECTION

PATENT NO. : 6,661,773 B1
DATED : December 9, 2003
INVENTOR(S) : Pelissier et al.

It is certified that error appears in the above-identified patent and that said Letters Patent is hereby corrected as shown below:

Column 4,
Line 18, delete "SI", insert -- S1 --.

Column 7,
Line 63, delete "268", insert -- 208 --.

Signed and Sealed this

Twenty-fourth Day of February, 2004

JON W. DUDAS
*Acting Director of the United States Patent and Trademark Office*